United States Patent [19]

Hayes

[11] 4,368,313

[45] Jan. 11, 1983

[54] STABILIZATION OF SILANOL HYDROLYSATES OF ORGANOSILANES

[75] Inventor: Susan E. Hayes, Schenectady, N.Y.

[73] Assignee: General Electric Company, Waterford, N.Y.

[21] Appl. No.: 303,340

[22] Filed: Sep. 18, 1981

[51] Int. Cl.$^3$ ............................................. C08G 77/06
[52] U.S. Cl. ...................................... 528/14; 528/19; 528/20; 528/23; 524/357
[58] Field of Search ....................... 528/14, 19, 20, 23; 524/357

[56] References Cited

U.S. PATENT DOCUMENTS

| | | | |
|---|---|---|---|
| 2,646,441 | 7/1953 | Duane | 556/450 |
| 2,719,859 | 10/1955 | Nitzche et al. | 556/455 |
| 2,744,878 | 5/1956 | Smith-Johannsen | 556/458 |
| 3,135,713 | 6/1964 | Brewer et al. | 528/21 |
| 3,304,318 | 2/1967 | Brady | 556/456 |
| 3,364,246 | 1/1968 | Rossmy | 556/459 |
| 3,375,223 | 3/1968 | Merrill | 528/14 |
| 3,389,114 | 6/1968 | Burzynski et al. | 260/32.8 SB |
| 3,395,117 | 7/1968 | Burzynski et al. | 528/12 |
| 3,450,672 | 6/1969 | Merrill | 528/12 |
| 3,489,782 | 1/1970 | Pruvost et al. | 556/415 |
| 3,861,939 | 1/1975 | Merrill et al. | 427/387 |
| 3,939,195 | 2/1976 | Lucking et al. | 556/459 |
| 4,077,994 | 3/1978 | Davies et al. | 556/455 |
| 4,175,159 | 11/1979 | Raleigh | 428/405 |
| 4,198,346 | 4/1980 | Knollmueller | 556/458 |
| 4,203,913 | 5/1980 | Burkhardt et al. | 556/456 |

OTHER PUBLICATIONS

W. Noll, *Chemistry and Technology of Silicones*, Academic Press, N.Y., 1968, p. 415.
Krauss and Kubens, The Curing of Silicone Resins, Chemical Abstracts 50 6811e, 1956.

*Primary Examiner*—Melvyn I. Marquis

[57] ABSTRACT

A method for stabilizing silanol hydrolysates of organosilanes in an acid medium is described. The method comprises adding a neutralizing agent containing a chelatable metal ion to the silanol hydrolysate in an acid medium to reduce the acidity of the medium; removing solids from the medium; and adding a chelating agent to form a chelate with metal in the medium. In a preferred embodiment, methyltrimethoxysilane is hydrolyzed with an excess of slightly acidic water; calcium carbonate neutralizing agent is added thereto to reduce the acidity of the medium; excess calcium carbonate and other solids in the medium are removed by filtration; and acetylacetone is added as a chelating agent to form a chelate or to interact with the calcium from the calcium carbonate neutralizing agent in the medium. The process of this invention stops haze formation in the products formed by the process of the invention and substantially extends the shelf life of silanol hydrolysates of organolsilanes.

34 Claims, No Drawings

STABILIZATION OF SILANOL HYDROLYSATES OF ORGANOSILANES

BACKGROUND OF THE INVENTION

The present invention relates to the stabilization of silanol compounds, and more particularly, to a method of stabilizing silanol hydrolysates of organosilanes and the stabilized silanol hydrolysates of organosilanes formed thereby.

The stability of the silanol hydrolysates of hydrolyzable organosilanes formed from silanes which have two or more hydrolyzable groups, especially those having a high silanol content, is particularly low. It has been observed that certain commercial polymers which are silanol hydrolysates of methyltrialkoxysilane show a gradual increase in molecular weight which limits the shelf life to about 3 months at 40° C. when the silanol compound is in solution.

The silanol hydrolysates made from silanes having two or more hydrolyzable groups, are difficult to stabilize, and it is believed that they have a very short shelf life due to the continuing condensation of silanol groups with other silanol groups, of silanol groups with alkoxy groups, and the like. Because of this reactivity of the silanol compounds having a high silanol content, the molecular weight of the compounds increases resulting in increased viscosity and/or gelation within relatively short periods of time.

One method of increasing the stability of these compounds having high silanol content, has been to reduce the acid content of the silanol compound. In prior art processes, this has been accomplished by subjecting the silanol compound to several reflux-washings with water after the hydrolysis of the hydrolyzable organosilane. The final acid level in the silanol hydrolyzate is generally between 0 and about 0.1 ppm hydrogen chloride, and even at these acid levels, the silanol hydrolysates of the hydrolyzable organosilanes show a gradual increase in molecular weight of the silanol compounds maintained at room temperature.

The acid is present in the silanol hydrolysates of organosilanes because of the methods used in making the silanol hydrolysates of hydrolyzable organosilanes. They are generally prepared in an acid medium. The usual method of hydrolyzing organosilanes is described throughout the prior art including U.S. Pat. No. 2,719,859 and U.S. Pat. No. 3,364,246. The usual method of hydrolyzing organosilanes is by means of water maintained at an acidic pH. For example, when an alkoxysilane is hydrolyzed with water, an acid, such as a halogen acid or acetic acid, is dissolved in the hydrolyzing medium, and the hydrolysate product is formed. In other instances, for example, when organohalosilanes are being hydrolyzed, halogen acid is produced as a reaction by-product, and the halogen acid dissolves in the hydrolyzing medium and steadily increases as the hydrolysis proceeds. In the prior art methods, reflux-washings with water have been used to eliminate or substantially reduce the acid content of the silanol hydrolysates of hydrolyzable organosilanes, however, it has been noted that the molecular weight of such silanol hydrolysates, especially those formed from silanes having an average of three or more hydrolyzable substituents, increases with time and thereby reduces the shelf life of the particular silanol compound.

Other methods have also been used to produce stable high silanol resins of chlorosilane hydrolysates and alkoxysilane hydrolysates. They include the process of U.S. Pat. No. 3,861,939 wherein the chlorosilane hydrolysis is carried out in a two phase aqueous/organic solvent system, and the acid-containing aqueous layer is separated from the siloxane resin solution as soon as the hydrolysis is complete. Although this method reduces the contact between the silanol-rich siloxane and the acid, it does not reduce it sufficiently for the controlled hydrolysis of alkyl trichlorosilanes ($RSiCl_3$). According to U.S. Pat. No. 3,861,939, further acid reduction is obtained by filtering the medium through diatomaceous earth thereby resulting in greater stability. In U.S. Pat. No. 3,489,782 the aqueous phase is separated from the organic phase followed by neutralization with a neutralizing agent, such as, sodium carbonate, and an aqueous wash of the organic phase resulting in a stable resin having a high silanol content from the hydrolysis of alkyl trichlorosilanes ($RSiCl_3$). In U.S. Pat. No. 3,135,713, neutralizing agents, for example ammonium carbonate, are used for the neutralization of excess by-product acid in making chlorosilane hydrolysates. However, it is difficult to filter out completely such neutralization by-products as ammonium chloride. Shelf stability of chlorosilane hydrolysates having moderate or intermediate silanol levels has been improved by removing all solvent and grinding the resin to a fine powder in the process disclosed in U.S. Pat. No. 3,450,672.

The stability of alkoxysilane hydrolysates is increased in U.S. Pat. No. 3,364,246, cited above, by the hydrolysis of an emulsion of the alkoxysilane in water and in U.S. Pat. Nos. 3,389,114 and 3,397,117 by using a very low level of acid and obtaining the resin as a solid. Although each of the foregoing prior art references suggests a method of stabilizing silanol hydrolysates of various organosilanes, it is desirable to provide improved methods of stabilizing such compositions.

SUMMARY OF THE INVENTION

It is the primary object of the invention to provide stabilized silanol compositions and an improved method of stabilizing silanol compounds.

It is another object of the present invention to provide stabilized silanol hydrolysates of organosilanes and an improved process of making stabilized silanol hydrolysates of organosilanes.

Still another object of the present invention is to provide a method for stabilizing silanol compounds made by reacting an acidic hydrolyzing medium with an organosilane.

A further object of the present invention is to eliminate or substantially reduce the conditions in the medium of unstable silanol hydrolysates of organosilanes which promote condensation and/or other reactions which reduce the shelf life of the silanol compounds.

It is another object of the present invention to provide a process for hydrolyzing hydrolyzable organosilanes to provide an improved silanol compound with improved shelf life.

It is another object of this invention to provide an improved process for stabilizing silanol hydrolysates of organosilanes which eliminates or substantially reduces the number of reflux washings required to stabilize the silanol compounds.

Other objects and advantages will be apparent from the following description.

In accordance with the objects of the invention, there is provided a method of stabilizing silanol hydrolysates of organosilanes in an acid medium comprising adding a neutralizing agent containing chelatable metal ion to reduce the acidity of the medium; removing solids from the medium; and adding a chelating agent to form a chelate with metal in the medium.

In accordance with the present invention there is also provided an improved method for making stabilized silanol hydrolysates of organosilanes comprising, reacting a hydrolyzing medium and an organosilane compound in an acid medium, the silane compound having the formula:

$$R_aSiX_{4-a}$$

wherein R is an organic radical attached directly to the silicon atom by carbon to silicon linkage, or R is a hydrogen atom attached directly to the silicon atom, or R is a mixture of the foregoing; X is a hydrolyzable substitutent; and a is an integer from 0 to 2 inclusive; adding a neutralizing agent containing a chelatable metal ion to reduce the acidity of the medium; removing solids from the medium; and adding a chelating agent to form a chelate with metal in the medium.

By treating the silanol compound with a neutralizing agent containing a chelatable metal ion and thereafter adding a chelating agent to combine with the chelatable metal ion in the neutralizing agent, substantial improvement in stability of the polymer containing silanol groups is realized. By the process of this invention, there is a substantial increase in shelf life of the polymer having silanol groups, especially hydrolysates of organosilanes having three hydrolyzable substituents which were prepared to maximize silanol constant.

As used herein, silanol hydrolysate is used interchangeably with silanol, silanol compound, silanol product, silanol hydrolysate of organosilane, and the like.

As used herein, stability is measured by the amount of change in molecular weight, viscosity and gelation. A polymer, that is, silanol hydrolysate of organosilanes, is stable or has improved stability when there is little or no change in molecular weight, little or no change in viscosity, and/or no gelation of the polymer.

In accordance with the present invention, it is critical that both a neutralizing agent and a chelating agent be used in the method of stabilizing the silanol. Furthermore, it is critical that the neutralizing agent contain a chelatable metal ion and that the chelating agent bonds or forms a chelate with the chelatable metal in the neutralizing agent. For example, when the neutralizing agent is calcium carbonate, it is critical that the chelating agent be a compound, such as 2,4-pentanedione, which forms a chelate, bonds with or otherwise interacts with the calcium in the calcium carbonate. When this sequence of steps is followed, the silanol product is stabilized as evidenced by its prolonged shelf life.

By following the process of the present invention, there is formed a stabilized, silanol hydrolysate of an organosilane having the metal of a neutralizing agent bound or otherwise interacted with a chelating agent to stabilize the silanol product. When the silanol compound is the hydrolysate of methyltrimethoxysilane, the product formed by the process of the present invention is a stabilized silanol hydrolysate of methyltrimethoxysilane containing 2,4-pentanedione which has chelated, interacted with or bound the metal ion or ions of a metal-containing neutralizing agent.

DETAILED DESCRIPTION OF THE INVENTION

Any silanol hydrolysates of organosilanes may be stabilized by the process of the present invention to form stabilized silanol hydrolysate products, and the silanol hydrolysates are generally prepared by hydrolyzing hydrolyzable organosilanes. One class of silanol hydrolysates of organosilanes which may be stabilized by the process of the present invention are those which are obtained by reacting a hydrolyzing medium and an organosilane compound in an acid medium, the silane compound having the formula:

$$R_aSiX_{4-a}$$

wherein R is an organic radial attached directly to the silicon atom, a hydrogen atom attached directly to the silicon atom or mixtures thereof; X is a hydrolyzable substituent; and a is 0, 1 or 2. In general, R may be selected from hydrogen, alkyl or alkenyl having from about 1 to about 18 carbon atoms or aryl or aralkyl having about 6 to about 24 carbon atoms. The organosilane compound may be one hydrolyzable silane compound or a mixture of hydrolyzable silane compounds.

In certain preferred embodiments, the organic radical may be alkyl, for example, methyl, ethyl, propyl, butyl, isopropyl, and any of the alkyl radicals having from 1 to about 8 carbon atoms including substituted alkyl radicals having substituents or functional groups which are compatible with the agents used in the process; aryl having about 6 to about 14 carbon atoms, for example, phenyl and naphthyl; cycloalkyl, for example, cyclohexane and cyclopentane; aralkyl having about 6 to about 14 carbon atoms, for example benzyl; alkaryl, for example, xylyl; halogenated alkyl, for example, chloromethyl, bromoethyl, 1-chloropentyl; halogenated aryl, for example, chlorophenyl and dichlorophenyl; alkenyl radical, for example, vinyl, allyl, 1-propenyl and the like; and various mixtures of the foregoing. The hydrolyzable substituent of the organosilane may be a halogen or halogens, for example, chlorine, bromine and the like; and alkoxy group or alkoxy groups, for example, methoxy, ethoxy, propoxy, butoxy, and the like; and mixtures of the foregoing. In the most preferred embodiments, the silanol hydrolysates of organosilanes which are used in the process of the present invention include methyltrimethoxysilane, methyltrichlorosilane, methyltriethoxysilane, tetraethoxysilane, methyltriacetoxysilane, and the like.

In certain embodiments in the formula:

$$R_aSiX_{4-a}$$

all of the atoms substituted upon the silicon atom may be hydrolyzable. Thus, the silicon atom may have from 2 to 4 alkoxy radicals substituted thereon, and said radicals may all be the same or different, or the silicon atom may have from 2 to 4 halogen atoms substituted thereon, and all of the hydrolyzable halogen atoms may be the same or different, or the hydrolyzable substituents may be mixtures of alkoxy radicals and halogen atoms, and the silicon atom may have 1 alkoxy group and 1 halogen atom, or 2 alkoxy groups and 1 halogen atom and the like. As discussed above, at least two substituents upon the silicon atom must be hydrolyzable, and the other atoms substituted upon the silicon atom can be any suitable radical or atom as long as the silicon compound remains hydrolyzable. For example, the non-hydrolyzable substituents upon the silicon atom include, hydrogen, alkyl radical, cycloalkyl radical, aryl radical, aralkyl radical, alkaryl radical alkenyl radical and the like, and mixtures of the foregoing.

The process of the present invention is applicable to other silanol compounds, especially those which are silanol hydrolysates of organosilanes including those described in U.S. Pat. No. 2,791,859, U.S. Pat. No. 2,646,441, U.S. Pat. No. 3,364,246, U.S. Pat. No. 4,198,346 and U.S. Pat. No. 3,489,782.

The acid content of the medium may be provided from any source, and the medium may be acidic from the hydrolysis reaction, or the medium may be acidic from the addition of acid or both. For example, the acid medium may result from the acid catalyst used in the reaction of the hydrolyzing medium and the organosilane compound to promote the reaction, or it may result from reaction of the hydrolyzing medium and the organosilane compound as a by-product of the hydrolysis reaction. For example, when organohalosilanes are used as the organosilane compound, halogen acid is produced during the hydrolysis reaction, and the reaction medium becomes increasingly acid as the halogen acid by-product is generated and dissolves in the reaction medium. In other cases, it is often necessary to add acid to promote the hydrolysis reaction, and in these embodiments, it is necessary to add the acid to provide an acid medium for the reaction. In one embodiment aqueous acid (acidic water) is added to the silane to form the silanol hydrolysate in an acid medium. Conventional acids added to provide an acid medium and to act as catalysts in the hydrolysis reaction include conventional mineral acids, such as, hydrochloric acid, hydrobromic acid, sulfuric acid and the like, or organic acids, such as, acetic acid, propionic acid and the like.

Various hydrolyzable silane compounds which may be used in the process of the present invention, and which may be hydrolyzed to form silanol hydrolysates of organosilanes, include alkoxysilanes, alkylalkoxysilanes, arylalkoxysilanes, alkylhalosilanes and arylhalosilanes, and the like. In the hydrolysis step, liquid aqueous hydrolyzing media are preferred, and the hydrolyzing medium can be water alone, or if desired, a mixture of water and diluents. When the organoalkoxysilanes are hydrolyzed, it is preferable that a catalyst for the hydrolysis, such as hydrogen chloride, sulfuric acid, and the like, be added to the hydrolysis medium. The means for effecting hydrolysis of the organosilane is not critical in the practice of the present invention, and any conventional hydrolysis media and methods may be used to obtain a silanol hydrolysate of an organosilane.

One of the advantages of the process of the present invention is the elimination or reduction of the number of reflux-washings used in the prior art processes to reduce or eliminate the acid in the acid medium. Howver, it may be advantageous to supplement the steps of the present invention with a reflux-washing with water to dilute the acid, especially when the acid is present in high concentrations in the acid medium. For example, when methyltrichlorosilane is used as the hydrolyzable organosilane, a high concentration of hydrogen chloride formed by the hydrolysis reaction is dissolved in the reaction medium to form the acid medium. In this instance, it may be desirable to wash the acid medium with water or to carry out a reflux-washing of the acid medium with water to dilute the acid content of the acid medium prior to adding the neutralizing agent. Thus, this may be considered as an optional step in the process of the present invention which comprises adding a neutralizing agent to reduce the acidity of the medium and adding a chelating agent to form a chelate with the metal in the neutralizing agent.

Although the application of heat is not critical in the reaction of the hydrolyzing medium and the organosilane compound in the acid medium, it may be desirable to heat the hydrolysis reaction to assist in the hydrolysis and to form a polymer or resin from the silanol hydrolysate of the organosilane. Thus, as an optional step in the process of the present invention, it may be desirable to heat the water and the silane compound under reflux to form a resin from the hydrolysate.

The neutralizing agent is added to the silanol hydrolysate of organosilanes in an acid medium to reduce the acidity of the medium. The silanol hydrolysate is treated with the neutralizing agent after the hydrolyzing medium and the organosilane compound have reacted in an acid medium and/or after the desired formation of the silanol hydrolysate. The neutralizing agent may be any conventional agent which can reduce the acidity of the acid medium without adversely affecting the silanol hydrolysate and without leaving a detrimentally large caustic residue in the product. In accordance with the present invention, it is critical that the neutralizing agent contain a chelatable metal ion which can be interacted with or bound by a chelating agent subsequently added to the medium. In accordance with the present invention, a neutralizing agent containing a chelatable metal ion is an agent which cannot only reduce the acidity of the acid medium, but also has a metal ion which can be effectively removed by the action of a chelating agent subsequently added to the medium and discussed in more detail below. A chelatable metal ion is defined herein as a metal ion in a compound which compound can neutralize an acid medium, and thereafter be effectively removed by the action of a chelating agent added to the medium. While the chelatable metal ion is in solution in the neutralized medium, it is believed that the chelating agents added thereto bind, tie-up, or otherwise interact so that the metal ion is no longer active in the medium.

Typical neutralizing agents which contain a chelatable metal ion and which reduce the acidity of the acid medium containing the silanol hydrolysate or organosilane, are the carbonates of the Group IIa metals of the Periodic Chart of the Elements. As used herein, the carbonates also embrace the bicarbonates. Typical examples of carbonates of the Group IIa metals of the Periodic Chart of the Elements are calcium carbonate, magnesium carbonate and barium carbonate. Other neutralizing agents include the carbonates of the Group Ia metals of the Periodic Chart of the Elements, including, for example, sodium carbonate, sodium bicarbonate, potassium carbonate and potassium bicarbonate. Other examples of neutralizing agents which contain a chelatable metal ion and reduce the acidity of the medium without leaving a caustic or basic residue in the product, are insoluble metal oxides, for example, magnesium oxide. Other examples of neutralizing agents which can reduce the acidity of the medium and which contain a chelatable metal ion and which can be added to the silanol hydrolysates of organosilanes in accordance with the present invention, can be easily determined by one skilled in the art.

The amount of neutralizing agent which may be used to reduce the acidity of the acid medium is not critical and may vary as desired. The amount of neutralizing agent added to the silanol hydrolysate may also vary depending upon the particular agent or mixture of agents chosen as a neutralizing agent and may vary depending upon the amount of acid or the acid content of the acid medium, the acidity of which must be reduced to stabilize the silanol hydrolysate. In preferred embodiments of the present invention, a sufficient amount of neutralizing agent containing the chelatable metal ion or ions is added to the silanol hydrolysate in an acid medium to reduce the acidity to about 500 ppm or lower, and more preferably, to an acid content of about 0.0 ppm. Thus, in accordance with the most preferred embodiments of the invention, a sufficient amount of neutralizing agent is added to the acid medium to change the pH to about 6.5 to about 7.0, and more preferably to a pH of about 7.0. The addition of the acid may be easily monitored or followed by determining the pH of the medium and/or by otherwise determining the acid content of the medium. In most preferred embodiments, the neutralizing agent is added to the acid medium as a solid. Calcium carbonate and magnesium oxide are substantially insoluble in water. Thus, for example, when calcium carbonate or magnesium oxide are used as a neutralizing agent, the solid neutralizing agent may be added directly to the medium. In certain other embodiments, however, the neutralizing agent may be dissolved in water before adding to the acid medium to reduce the acidity of the medium. Generally, the insoluble neutralizing agents are preferred. If an excess beyond the amount needed to neutralize the hydrolysate is added, it does not dissolve in the medium, and it can be easily removed, for example, by filtration. If the neutralizing agent is soluble in water or in the aqueous hydrolysis medium, then additional amounts of chelating agent must be added to the medium. A sufficient amount of chelating agent must be added to react with all of the metal ion dissolved in the hydrolysate or resin solution.

Excess solid neutralizing agent is removed from the medium by any suitable means. In most preferred embodiments, a simple filtration technique or system is suitable for removal of the solids. Naturally, any other solid particles in the medium are also removed during this step of the process.

After the removal of any solids from the medium, the fluid or liquid medium is then treated with a chelating agent which is suitable to form a chelate or to bind with or otherwise interact with the metal of the neutralizing agent in the medium. The amount of chelating agent and the type of chelating agent is not critical as long as the chelating agent effectively interacts with the metal ion of the neutralizing agent. Effective interaction or effective removal of the metal ion of the neutralizing agent means that amount of chelating agent sufficient to bind or tie up or otherwise interact with any metal ions or a substantial amount of the metal ions in the medium so that they are no longer free in the form of ions in the medium. The stoichiometric amount of chelating agent which will interact with the metal ion of the neutralizing agent, may be easily determined by one skilled in the art by determining the amount of metal ion in the neutralizing agent added to the silanol hydrolysate. Generally, an excess of the chelating agent may be used in the medium. In preferred embodiments, about 0.01% to about 2.0% by weight of the chelating agent, based upon the weight of the medium, may be added to the medium. Examples of the chelating agent include acetylacetone, acetoacetic ester, malonic acid and biacetyl.

As an optional step, and prior to the addition of a volatile chelating agent to the medium, it may be desirable to remove certain by-products from the medium for example, in many cases, alcohol or alcohols are formed as byproducts in the reaction and remain in the medium. These may be removed by any suitable technique, such as by distillation, and the distillation may be carried out prior to or subsequent to the removal of solids from the medium. Water may also be removed from the medium by distillation or other suitable techniques as an optional step in the process of the present invention. When stripping or other removal of by-products is carried out in accordance with the present invention as an optional step, it is not critical how much of the water and/or by-products are removed from the medium. The removal of alcohols and/or water can be carried out until any desired solids content is achieved. In certain preferred embodiments, the solids content of the medium can be increased by removing by-products and water from the medium before or after adding the neutralizing agent thereto.

In one preferred embodiment, methyltrimethoxysilane is hydrolyzed with an excess of slightly acidic water to give T resin solutions of high silanol content. Evaporation of the solvent from a thin layer of these resin solutions leaves an oily film which becomes crosslinked and hard upon heating at about 170° C. to about 180° C. for 2 to 5 minutes. Generally, these resins cannot be effectively used because of their instability. Typically, 60% solutions of the resins, that is, the T resin solutions of high silanol content, become hazy within a few hours and gel within about 1 to about 3 weeks. In accordance with the present invention, when the T resin solutions of high silanol content are neutralized with a neutralizing agent, such as, calcium carbonate, then treated with a small amount of a chelating agent which is capable of chelating or otherwise interacting with the calcium metal ions or other metal ions, haze formation is stopped and the shelf life of the resin solution is substantially extended. A typical example of a chelating agent which interacts with and effectively ties up the calcium ion of the calcium carbonate neutralizing agent, is 2,4-pentanedione (acetylacetone).

The stabilized high silanol hydrolysates of organosilanes may be used as binders for mica mats and it has also been demonstrated that they improve the scratch and solvent resistance of polycarbonates when they are applied as a coating upon polycarbonate sheets. The stabilized compositions of the present invention comprise the product obtained by adding a neutralizing agent containing a chelatable metal ion to the acid medium containing a silanol hydrolysate or organosilane; removing all solids from the medium; and adding a chelating agent to interact with metal ions in the medium. In preferred embodiments, the stabilized silanol hydrolysates of organosilanes comprise a silanol hydrolysate of organosilane, and acid neutralizing agent containing a chelatable metal ion and a chelating agent which has interacted with the metal ion in the medium. The pH of the medium is generally about 7.0 and in preferred embodiments contains a sufficient amount of chelating agent to interact with the metal ion in the medium. In certain preferred embodiments the composition contains about 0.01% to about 2.0% by volume of the chelating agent. One preferred stabilized composition contains the silanol hydrolysate of methyltrimethoxysilane in an acid medium neutralized with calcium carbonate and 2,4-pentanedione to form a chelate compound with the calcium of the neutralized calcium carbonate.

The following examples further define and describe the process and products of the present invention and illustrate the preferred embodiments of the present invention.

EXAMPLE 1

Water (10.9 moles) containing sufficient hydrochloric acid to give a reaction mixture containing 9 ppm hydrochloric acid was added slowly to 7.04 moles of methyltrimethoxysilane. The mixture was heated under reflux for one hour and then divided into two equal portions. One of the portions was treated with 0.005 gram of calcium carbonate. Both portions were then stripped (distilled) at one atmosphere pressure until the mixture had a 60% solids content. The reaction mixture was then filtered to remove solid material therein, and the solutions were treated with 2,4-pentanedione. The results are shown in Table I below.

TABLE I

EFFECT OF NEUTRALIZATION AND CHELATION ON STABILITY

| Sample | CaCO$_3$ | 2,4-Pentanedione (Wt % Added) | Initial Viscosity | Viscosity After 7 Days | Time To Gell |
|---|---|---|---|---|---|
| 1 | No | 0 | 12 cps. | 25 cps. | 14 days |
| 2 | No | 1% | 12 cps. | 45 cps. | 14 days |
| 3 | No | 5% | 12 cps. | 76 cps. | 14 days |
| 4 | Yes | 0 | 34 cps. | gel | 7 days |
| 5 | Yes | 1% | 26 cps. | 34 cps. | >88 days |

It can be seen from the data in Table I above that there was little improvement by the addition of 1% (by weight based upon the weight of the mixture) of 2,4-pentanedione in stabilizing the silanol hydrolysate of methyltrimethoxysilane merely by adding the chelating agent. In fact, the viscosity of the silanol hydrolysate increased more with the 2,4-pentanedione added to the silanol hydrolysate in sample 2 than it did in the sample 1 which had no additional treatment whatsoever. Thus, it can be concluded that the addition of a typical chelating agent, such as 2,4-pentanedione, actually decreases shelf life as evidenced by the increased viscosity after 7 days. Calcium carbonate treatment alone is also detrimental to stability as seen by comparing the data of Samples 4 and 1. Sample 5 which combines calcium carbonate neutralization with chelate treatment, illustrates the improvement obtained by using the invention.

EXAMPLE 2

Water (3.87 moles) containing 25 ppm hydrofluoric acid and 30 ppm hydrochloric acid was added slowly to 2.35 moles of methyltrimethoxysilane as described in Example 1. The reaction medium was treated with 0.2 gram of calcium carbonate, stripped to 60% solids by distillation at one atmosphere pressure and then filtered. The solution was then divided and treated with 2,4-pentanedione as shown in Table II below.

TABLE II

EFFECT OF CaCO$_3$ AND 2,4-PENTANEDIONE ON SHELF LIFE

| Sample | CaCO$_3$ | 2,4-Pentanedione % Added (by Vol.) | Initial Viscosity | Final Viscosity | Final Viscosity |
|---|---|---|---|---|---|
| 1 | Yes | 0% | 10 cps. | Gel | 31 days |
| 2 | Yes | 1% | 8 cps. | 10 cps. | 74 days |

As the Tables show, either calcium carbonate neutralization or 2,4-pentanedione addition alone decreases shelf life. However, considerable stability is gained by using both the neutralization agent and the 2,4-pentanedione. This suggests that a synergistic effect occurs between the neutralizing agent containing the chelatable metal ion and the chelating agent which stabilize the hydrolysates. It is believed that the calcium carbonate treatment alone adversely effects these solutions because the methanol/water content of 40% dissolves calcium salts of neutralization which are known silanol condensation catalysts. The 2,4-pentanedione used previously to increase the pot life of metal catalyzed resins, chelates the dissolved calcium, inactivating it.

From the foregoing data, it can be seen that the method of stabilization of the process of this invention should be useful for any acidic, silanol-rich resin solution which is sufficiently polar to dissolve calcium or other metal ion silanol condensation catalysts. In accordance with at least some of the objects of the present invention, silanol hydrolysates of organosilanes which condense in an acid medium and which are normally considered unstable because of such condensation, have been stabilized.

While the invention has been described with respect to preferred embodiments, it will be apparent that certain modifications and changes can be made without departing from the spirit and scope of the invention, and therefore, it is intended that the foregoing disclosure be limited only by the claims appended hereto.

What is claimed is:

1. A method of stabilizing silanol hydrolysates of organosilanes in an acid medium comprising:
   (a) adding a neutralizing agent containing a chelatable metal ion to the acid medium containing a silanol hydrolysate of organosilane to reduce the acidity of the medium to a pH of from about 6.5 to about 7.0;
   (b) removing solids from the medium; and
   (c) adding a chelate agent to form a chelate with metal in the medium.
2. The method of claim 1 wherein the neutralizing agent is a carbonate of a Group Ia metal or Group IIa metal.
3. The method of claims 1 or 2 wherein the neutralizing agent is selected from the group consisting of calcium carbonate, magnesium carbonate and barium carbonate.
4. The method of claim 1 wherein the neutralizing agent is magnesium oxide.
5. The method of claim 1 wherein a sufficient amount of neutralizing agent is added to the medium to adjust the pH of the medium to about 7.0.
6. The method of claims 1 or 2 wherein the neutralizing agent is selected from the group consisting of sodium carbonate, sodium bicarbonate, potassium carbonate, and potassium bicarbonate.

7. The method of claim 1 further comprising removing the solids from the medium by filtration.

8. The method of claim 1 wherein the chelating agent is selected from the group consisting of acetylacetone, acetoacetic ester, malonic acid and biacetyl.

9. The method of making stabilized silanol hydrolysates of organosilanes comprising:
(a) reacting a hydrolyzing medium and an organosilane compound in an acid medium, the silane compound having the formula:

$$R_aSiX_{4-a}$$

wherein R is an organic radical attached directly to the silicon atom, a hydrogen atom attached directly to the silicon atom or mixtures thereof; x is a hydrolyzable substituent; and a is 0, 1 or 2 to form a silanol hydrolysate of organosilane in an acid medium;
(b) adding a neutralizing agent containing a chelatable metal ion to the silanol hydrolysate in an acid medium to reduce the acidity of the medium to a pH of from about 6.5 to about 7.0;
(c) removing solids from the medium; and adding a chelating agent to form a chelate with chelatable metal in the medium.

10. The method of claim 9 wherein the organic radical is selected from the group consisting of alkyl, aryl, cycloalkyl, arylalkyl, alkaryl, alkenyl, halogenated alkyl, halogenated aryl and mixtures thereof.

11. The method of claim 9 wherein the hydrolyzable substituent is selected from the group consisting of chlorine, bromine, alkoxy and mixtures thereof.

12. The method of claim 9 wherein the silane compound is selected from the group consisting of alkoxysilane, alkylalkoxysilane, arylalkoxysilane, alkylhalosilane and arylhalosilane.

13. The method of claim 9 wherein the silane compound is methyltrimethoxysilane.

14. The method of claim 9 wherein the silane compound is methyltrichlorosilane.

15. The method of claim 9 wherein the hydrolyzing medium is water.

16. The method of claim 9 further comprising washing the acid medium with water to dilute the acid content of the acid medium prior to adding the neutralizing agent.

17. The method of claim 9 further comprising heating the water and the silane compound under reflux to form a resin.

18. The method of claim 9 further comprising adding acid to provide an acid medium.

19. The method of claim 9 wherein the neutralizing agent is a carbonate of a Group Ia metal or Group IIa metal.

20. The method of claims 9 or 19 wherein the neutralizing agent is selected from the group consisting of calcium carbonate, magnesium carbonate and barium carbonate.

21. The method of claim 9 wherein the neutralizing agent is magnesium oxide.

22. The method of claims 9 or 19 wherein the neutralizing agent is selected from the group consisting of sodium carbonate, sodium bicarbonate, potassium carbonate, and potassium bicarbonate.

23. The method of claim 9 further comprising increasing the solids content of the medium by removing by-products and water from the medium.

24. The method of claim 23 wherein the solids content is increased by stripping alcohol formed as a by-product and water from the medium.

25. The method of claim 9 further comprising removing the solids from the medium by filtration.

26. The method of claim 9 wherein a sufficient amount of neutralizing agent is added to the medium to adjust the pH of the medium to about 7.0.

27. The method of claim 9 wherein the chelating agent is selected from the group consisting of acetylacetone, acetoacetic ester, malonic acid and biacetyl.

28. The method of claims 9 or 27 wherein about 0.01% to about 2.0% by weight of the chelating agent is added to the medium.

29. The stabilized silanol hydrolysates of organosilanes stabilized by the process of claim 1.

30. The stabilized silanol hydrolysates of organosilanes made by the method of claim 9.

31. The stabilized silanol hydrolysate of methyltrimethoxysilane made by the method of claim 13.

32. The stabilized silanol hydrolysate of methyltrichlorosilane made by the method of claim 14.

33. The method of making a stabilized silanol hydrolysate of methyltrimethoxysilane comprising:
(a) adding a stoichiometric excess of acidic water slowly to methyltrimethoxysilane to form a silanol hydrolysate of methyltrimethoxysilane in an acid medium;
(b) adding calcium carbonate to the silanol hydrolysate of methyltrimethoxysilane in an acid medium to reduce the acidity of the medium;
(c) removing unreacted solid calcium carbonate from the medium; and
(d) adding 2,4-pentanedione to the medium to form a chelate compound with dissolved calcium from the calcium carbonate.

34. The stabilized silanol hydrolysate of methyltrimethoxysilane made by the method of claim 33.

* * * * *